United States Patent [19]

Heitzman

[11] 4,203,060
[45] May 13, 1980

[54] VISUAL FEED CONTROL ASSEMBLY FOR CARRIAGE-FED SAWMILL SAWS

[76] Inventor: Russell A. Heitzman, 349 W. 14th St., McMinnville, Oreg. 97128

[21] Appl. No.: 861,572

[22] Filed: Dec. 16, 1977

[51] Int. Cl.² .............................................. G08B 21/00
[52] U.S. Cl. ..................................... 318/474; 318/332
[58] Field of Search ................................. 318/332, 474

[56] References Cited

U.S. PATENT DOCUMENTS

| | | | |
|---|---|---|---|
| 1,070,638 | 8/1913 | Thullen | 318/332 |
| 2,668,268 | 2/1954 | Hunter et al. | 318/474 |
| 3,435,289 | 3/1969 | Aselman, Jr. | 318/474 X |

*Primary Examiner*—J. V. Truhe
*Assistant Examiner*—W. E. Duncanson, Jr.
*Attorney, Agent, or Firm*—Eugene D. Farley

[57] ABSTRACT

A visual feed control assembly for carriage-fed, electric motor driven sawmill saws comprises in combination with the electric drive motor of the saw electric circuits including first and second trip current relays with associated first and second electrically operated lights or other signals. The trip current relays are preset, the one to operate its associated signal at a predetermined minimum saw motor amperage load and the other to energize its associated signal at a predetermined maximum saw motor amperage load. The signals enable the operator to adjust the carriage speed to suit the saw so that the saw operates at maximum efficiency at all times, irregardless of the size and character of the logs being sawed.

3 Claims, 1 Drawing Figure

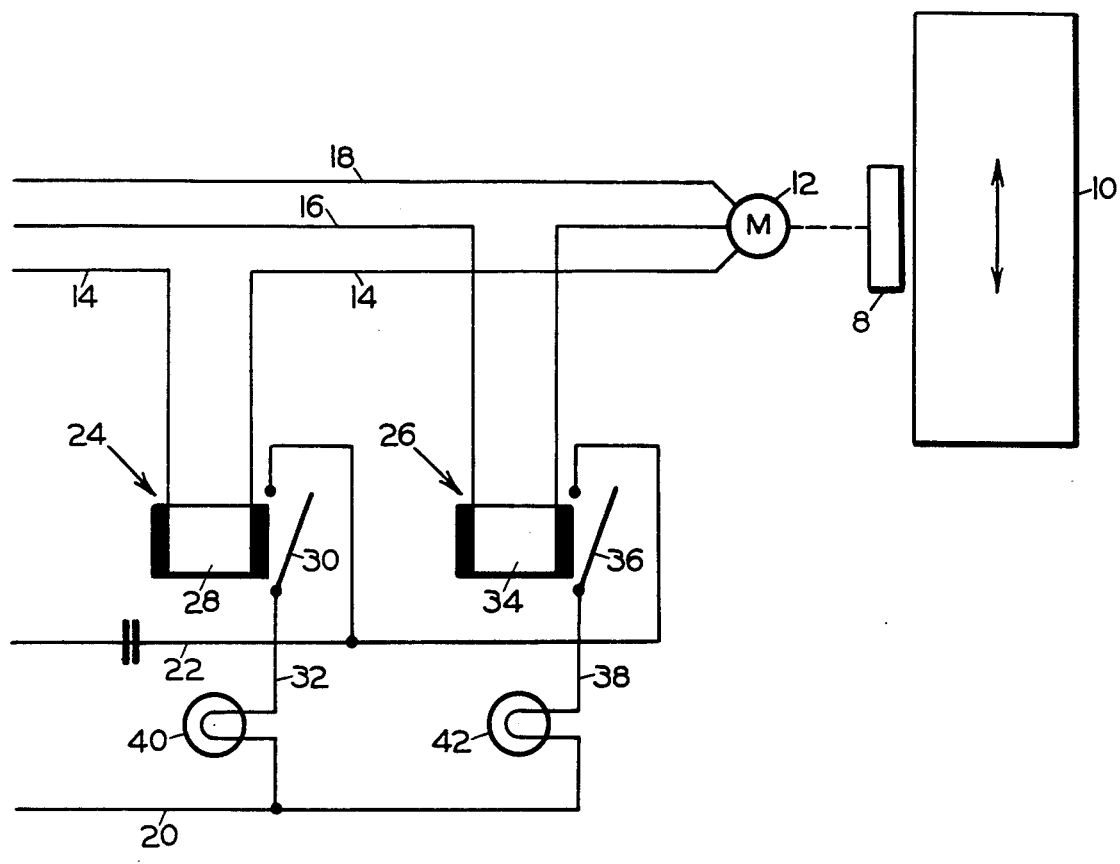

VISUAL FEED CONTROL ASSEMBLY FOR CARRIAGE-FED SAWMILL SAWS

BACKGROUND AND GENERAL STATEMENT OF THE INVENTION

This invention relates to carriage-fed sawmill saws.

In the operation of sawmills, it is conventional practice to reduce logs or cants to lumber by placing them one at a time on a sawmill carriage which is reciprocated with respect to a saw. At each pass of the carriage, a board is sawn from the log. This sequence is repeated until the log has been entirely converted to lumber.

The lumber output of the mill obviously is determined by the speed with which the carriage is driven. The faster the drive, the larger the amount of lumber produced in a unit time.

There is a limit, however, to the speed with which the log may be fed to the saw. Sawing too fast causes the resulting lumber to be mis-cut or ruined because the saw will stand only a limited amount of feed. If carried to the extreme, it will damage the saw and may injure the operating personnel.

On the other hand, sawing the log at less than the maximum permissible rate wastes time and lowers production.

The carriage operator thus is faced with a dilemma. If he operates the carriage at too slow a speed, the efficiency of the mill is severely reduced. On the other hand, if he operates the carriage at too rapid a speed, the quality of the lumber product is reduced and damage to the saw may result.

This situation is aggravated by the fact that the logs being fed to the saw vary a great deal in size. The small logs obviously can be sawn at a higher speed, as determined by the speed of the carriage, than can the larger logs.

At the present time there is no way for the carriage operator to know precisely how fast to drive the carriage when processing a sequence of logs of varying diameter, except by the use of his own personal skills and experience. As a consequence, in order to be on the safe side, he tends to drive the carriage at speeds which are below the maximum permissible speed of operation. As noted, this correspondingly cuts down the mill production.

It is the general object of the present invention to provide a visual feed control assembly for carriage-feed sawmill saws which will assist the sawyer in overcoming the foregoing problems and enable him to drive the carriage at its maximum safe speed whatever the size of the logs being processed.

It is a further object of the present invention to provide a sawmill saw control assembly which is accurate, easily and inexpensively installed, easy to maintain, and adaptable for use in any sawmill having an electrically driven saw and associated reciprocating sawmill carriage.

The foregoing and other objects of the present invention are achieved by the provision of a visual feed control assembly comprising in combination an electric-motor-driven sawmill saw, a three-phase electric circuit electrically connected to the saw motor, and first and second trip current relay means each comprising a solenoid and associated switch. A second electric circuit includes first and second electrically operated signal means, e.g. differently colored electric lights.

The solenoid component of the first relay is in series in one of the lines of the three-phase electric circuit while the switch component thereof is in series with the first signal means in the second electric circuit. The solenoid component of the second relay is in series in another of the lines of the three-phase electric circuit while the switch component thereof is in series with the second signal in the second electric circuit.

The first relay is preset to operate at a predetermined minimum saw motor amperage load, thereby energizing the first signal. The second relay is preset to operate at a predetermined maximum saw motor amperage load, thereby energizing the second signal.

When the relays are set at minimum and maximum limits between which the carriage may be operated with maximum efficiency, the operator by simple reference to the signals can determine at what speed to drive the carriage.

DESCRIPTION OF A SPECIFIC EMBODIMENT OF THE INVENTION

In the drawings:

The single FIGURE of the drawings comprises a schematic circuit diagram illustrating the manner of arrangement of the hereindescribed sawmill saw feed control assembly in its relationship to a sawmill saw and the reciprocating log carriage with which it is associated.

Referring to the drawing:

A sawmill band saw or circular saw is indicated generally and schematically at 8. Its associated reciprocating sawmill log carriage is indicated generally and schematically at 10. As is conventional, this carriage comprises a wheeled vehicle mounted on tracks and supporting dogging apparatus which positions a log or cant on the carriage in operative position relative to a saw with respect to which the carriage is reciprocated.

The saw is driven by an electric motor 12 in a three-phase circuit, for example a 440 volt three-phase circuit including lines 14, 16 and 18.

Associated with the three phase electric circuit is a secondary circuit, for example a 110 volt circuit comprising lines 20 and 22.

First and second trip current relay means, indicated generally at 24 and 26, respectively, are included in the circuits.

Relay 24 includes a solenoid 28 in series circuit relationship with line 14 of the three-phase circuit and a switch, i.e. a normally open switch 30 in the embodiment illustrated, in a line 32 in parallel circuit relationship between lines 20, 22 of the second electric circuit.

Relay 26 includes a solenoid 34 in series circuit relationship in line 16 of the three-phase circuit. It also includes a switch 36, which is a normally open switch in the illustrated embodiment, and which is in a line 38 arranged in parallel between lines 20, 22 of the second electric circuit.

A first signal 40 is in series with switch 30 in line 32. A second signal 42 is in series with switch 36 in line 38.

The signals are electrically energized and may be either visual or audible in character. Preferably they comprise green and red lights respectively.

Relay 24 is preset to close its contacts only when the current in the saw motor circuit reaches a predetermined minimum level which corresponds to a minimum rate of feed of the sawmill carriage past the saw. When this occurs, the green light or other signal 40 is energized, giving visual indication to the operator that the sawmill carriage is operating at a speed at least equal to the minimum required for economical lumber mill operation.

Relay 26 is preset to close its contacts when the current in the saw motor circuit reaches a predetermined maximum. This will activate the red light 42, or other signal, and give indication to the operator that he is operating the sawmill carriage too fast, and thus presenting the possibility of miscutting or ruining lumber or breaking the saw.

The control assembly of this invention thus provides the sawyer with a visual or audible aid which allows him to operate the carriage at a maximum but safe speed. At the same time it insures obtaining the maximum rate of production of lumber from logs of all sizes.

Other benefits accruing from the application of my invention are: increased production; higher quality sawn lumber; increased safety for the sawyer, off-bearer and others; decreased file room labor because the saws are not taxed beyond their safe working limits; better saw performance; and elimination of the need for frequently changing dull saws.

Having thus described my invention in preferred embodiments, I claim:

1. The combination with an electric motor driven sawmill saw fed by a manually operated variable speed reciprocating log carriage, of a visual or audible signal feed control assembly consisting of:
   (a) a three-phase electric circuit electrically connected to the saw motor,
   (b) first and second trip current relay means each comprising a solenoid and an associated electric switch,
   (c) a second electric circuit,
   (d) first and second electrically operated visual or audible signal means in the second electric circuit,
   (e) the solenoid component of the first relay means being connected directly in series circuit relationship in one of the lines of the three-phase electric circuit, and the switch component thereof being in series circuit relationship with the first signal means in the second electric circuit,
   (f) the solenoid component of the second relay means being connected directly in series circuit relationship in another of the lines of the three-phase electric circuit and the switch component thereof being in series circuit relationship with the second signal means in the second electric circuit,
   (g) the first trip current relay means being preset to operate at a predetermined minimum saw motor amperage load, thereby energizing the first electric signal means to signal attainment of minimum log carriage feed rate, and
   (h) the second trip current relay means being preset to operate at a predetermined maximum saw motor amperage load, thereby energizing the second electric signal means to signal exceeding maximum log carriage feed rate.

2. The combination of claim 1 wherein the first and second electrically operated signal means comprise differently colored electric lights.

3. The combination with an electric motor driven sawmill saw fed by a manually operated variable speed reciprocating log carriage, of a visual or audible signal feed control assembly consisting of:
   (a) an electric circuit supplying variable electric current to the saw motor,
   (b) first and second trip current relay solenoid means in the electric circuit, and
   (c) first and second electrically operated visual or audible signal means in series circuit relationship with the switches of the first and second relay solenoid means, respectively,
   (d) the first relay solenoid means being preset to energize its associated signal means at a predetermined minimum saw motor amperage load to signal attainment of minimum log carriage feed rate, and
   (e) the second relay solenoid means being preset to energize its associated signal means at a predetermined maximum saw motor amperage load to signal exceeding maximum log carriage feed rate.

* * * * *